(No Model.)

W. TOEPFER.
GRAIN DISTRIBUTER FOR MALT KILNS.

No. 253,960. Patented Feb. 21, 1882.

Witnesses:
E. L. Asmus
Henry Lovenson

Inventor:
Wenzel Toepfer
by Stout & Underwood
Attorneys

UNITED STATES PATENT OFFICE.

WENZEL TOEPFER, OF MILWAUKEE, WISCONSIN.

GRAIN-DISTRIBUTER FOR MALT-KILNS.

SPECIFICATION forming part of Letters Patent No. 253,960, dated February 21, 1882.

Application filed December 20, 1881. (No model.)

*To all whom it may concern:*

Be it known that I, WENZEL TOEPFER, of Milwaukee, in the county of Milwaukee, and in the State of Wisconsin, have invented certain new and useful Improvements in Grain-Distributers for Malt-Kilns; and I do hereby declare that the following is a full, clear, and exact description thereof.

My invention relates to grain-distributers for malt-kilns, and will be fully described hereinafter.

Figure 1:
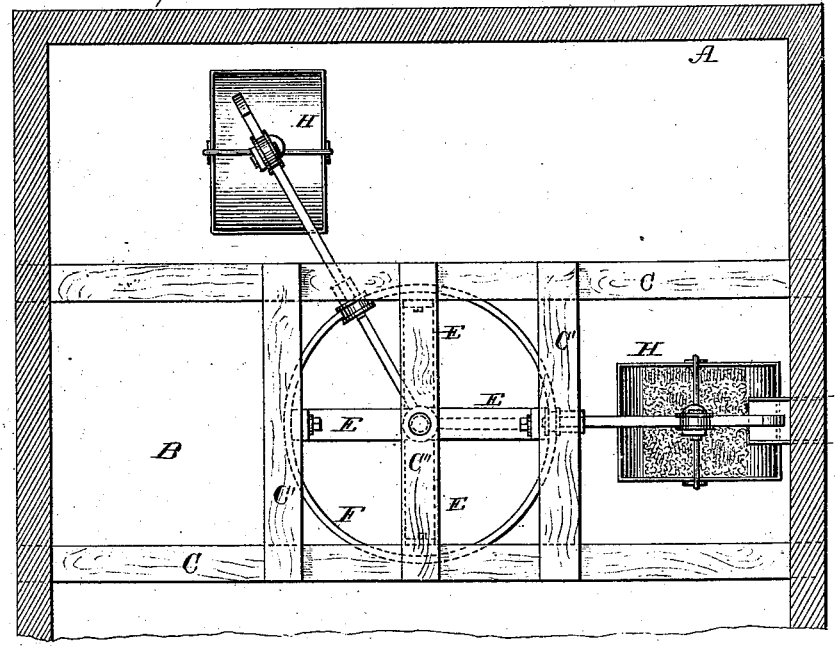
Figure 2:
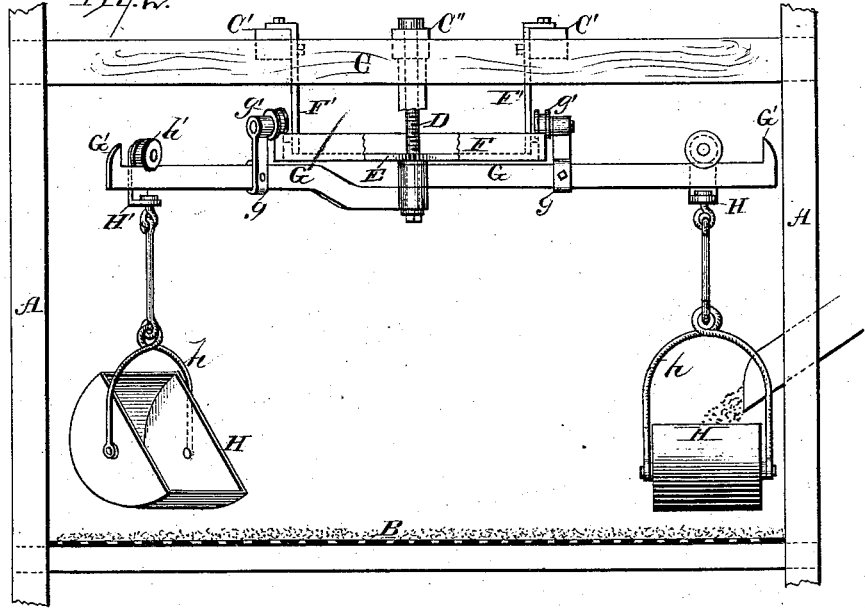

In the drawings, Figure 1 is a plan view of my device, and Fig. 2 is a side view.

A are the walls of one of the rooms of a malt-house. B is its drying-floor, and C are the timbers of its ceiling. $C'$ $C''$ are cross-pieces resting on timbers C, and D is a rod depending from the center of the center-piece $C^2$. This rod passes through the center of two cross-pieces, E, of a circular way, F, and on its lower end are pivoted arms G G, that are further supported by brackets $g$, hooked under said arms, and carrying sheaves $g'$, that ride upon the way F. Hangers F', bolted to the cross-pieces E also serve as additional supports for the way F and permit the sheaves to traverse the entire circle unimpeded. The arms G have hooked ends $G'$. The grain-buckets H have bails $h$, and these are hung to brackets H', which, like brackets $g$, carry sheaves $h'$, and by these sheaves the brackets H' are hung from arms G, the grooves therein fitting over arms G. A spout passing through the wall of the room serves to convey the grain to the room and into the buckets H, which can be carried directly up under the spout, as their brackets move freely on the arms G, and then as the arms G turn freely on shaft D the buckets may be guided around and the grain dumped upon any portion of the floor desired by a very slight application of force.

What I claim as my invention, and desire to secure by Letters Patent, is—

1. In grain-distributers, arms having a central pivotal support, in combination with buckets suspended from sheaved brackets traveling thereon.

2. The combination, with pivoted arms, of supporting-brackets having sheaves that travel on a circular way.

3. The combination of circular way, a central supporting-rod, arms having brackets $g$, and brackets supported on said arms from sheaved brackets, as set forth.

In testimony that I claim the foregoing I have hereunto set my hand this 10th day of December, 1881.

WENZEL TOEPFER.

Witnesses:
 STANLEY S. STOUT,
 HAROLD G. UNDERWOOD.